United States Patent [19]
Hurwitz

[11] 3,831,401
[45] Aug. 27, 1974

[54] SLIP CLUTCH FOR OUTBOARD MOTOR
[76] Inventor: Mathew Hurwitz, 63 Oakland Ave., Auburndale, Mass. 02166
[22] Filed: Aug. 30, 1973
[21] Appl. No.: 392,982

[52] U.S. Cl............. 64/30 R, 192/95, 192/107 M, 192/111 B, 192/109 A, 151/5
[51] Int. Cl........................................... F16d 43/20
[58] Field of Search............ 64/30 R, 30 C; 192/94, 192/95, 109 A; 416/169; 64/30 D

[56] References Cited
UNITED STATES PATENTS
| | | | |
|---|---|---|---|
| 891,280 | 6/1908 | Morgan................................ | 192/95 |
| 2,214,762 | 9/1940 | Eksergian...................... | 192/109 A |
| 2,642,730 | 6/1953 | Snyder........................... | 416/169 X |
| 2,679,909 | 6/1954 | Kiekhaefer..................... | 64/30 R X |

Primary Examiner—Benjamin W. Wyche
Attorney, Agent, or Firm—Arnstein, Gluck, Weitzenfeld & Minow

[57] ABSTRACT

An improved slip clutch for outboard motors which prevents damage to the propeller and drive train and which eliminates shear pin breakage. The clutch friction mechanism is incorporated within a propeller hub while the mechanism for maintaining the clutch preload is housed within a special hub nut designed for ease of calibration and resistance to corrosion and abrasion.

9 Claims, 2 Drawing Figures 3,831,401

SLIP CLUTCH FOR OUTBOARD MOTOR

BACKGROUND OF THE INVENTION

In outboard motors whose drive trains are protected by conventional shear pins, the replacement of broken pins can prove to be a major inconvenience to a user. To ameliorate this problem, manufacturers commonly design the shear pin to break only when it is subjected to forces just below levels capable of damaging the gears, drive shaft, and propeller shaft. As a result the shear torque for the pin is far in excess of the maximum delivered torque of the outboard motor. One consequence of this approach is that propellers receive inadequate protection and frequently may be subjected to injurious forces while the shear pin remains intact. For example, in a typical well-known 7 ½ H.P. outboard motor, the shear pin is designed to break when the torque at the propeller exceeds 1150 inch lbs. This is roughly six and one-half times higher than the maximum engine torque, as measured at the propeller shaft. Clearly, while such overdesign of the shear pin reduces the incidence of broken pins, the added convenience is paid for in added abuse to the propeller. The need has long been recognized for a practical slip clutch to protect the entire drive train, including the propeller, by limiting drive train torque to a level just above that at maximum engine output. Prior slip clutches have met with limited acceptance by manufacturers and users alike for a number of reasons among which are their complexity, unreliability, high cost, and difficulty of field service. This last is quite important because, even with the best slip clutch, wear in the clutch friction elements or even occasional propeller damage is inevitable and when this occurs it is vital that the clutch system be easily and accurately re-adjusted in the field by the user. Prior slip clutch systems inherently have been deficient in this regard. Many prior slip clutch units are constructed integrally with the propeller and are assembled and pre-adjusted by the manufacturer. These units are costly because the user must purchase an entire clutch assembly when replacing a propeller. Another disadvantage of some prior slip clutches lies in their use of metal springs to provide the necessary normal force or pre-load to maintain engagement of the friction elements. Such springs are highly vulnerable to failure by corrosion and fatigue. Still another shortcoming of many prior slip clutches is the vulnerability of their pre-load mechanisms to damage or severe wear by the abrasive action of sand and silt normally encountered when the outboard motor is used in situations of frequent bottom impingement in shallow water.

SUMMARY OF THE INVENTION

The primary object of the present invention to provide an improved slip clutch for outboard motor propellers which is capable of being calibrated by the average user without the use of special tools to slip at torques which are 20 to 50 percent above the torque developed at maximum engine output.

Another object is to provide a simple, low cost slip clutch which may be incorporated economically, even in inexpensive outboard motors.

Still another object is the provision of a slip clutch having mechanism which is incorporated entirely within an existing propeller hub cavity and within a special propeller hub nut so that no structural changes to the existing engine, gear case, or propeller are necessary.

A further object is the provision of a slip clutch mechanism in which the necessary pre-load is provided by a special hub nut without the use of metal springs to provide a unit not subject to corrosion and fatigue.

Other and further objects and advantages of the present invention will become apparent from the following description.

BRIEF DESCRIPTION OF A PREFERRED EMBODIMENT

Figure 1:
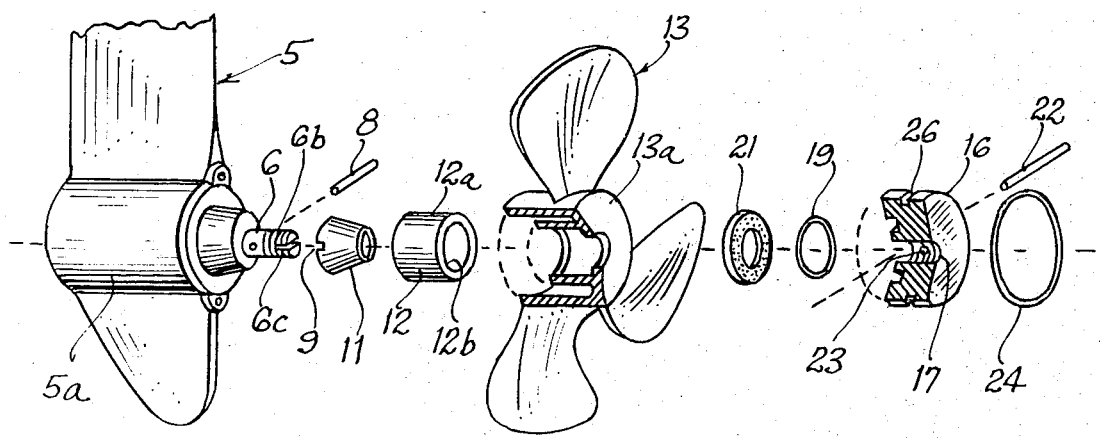
FIG. 1 is an exploded perspective view illustrating an embodiment of my invention with certain of the components cut away to show structural details.
Figure 2:
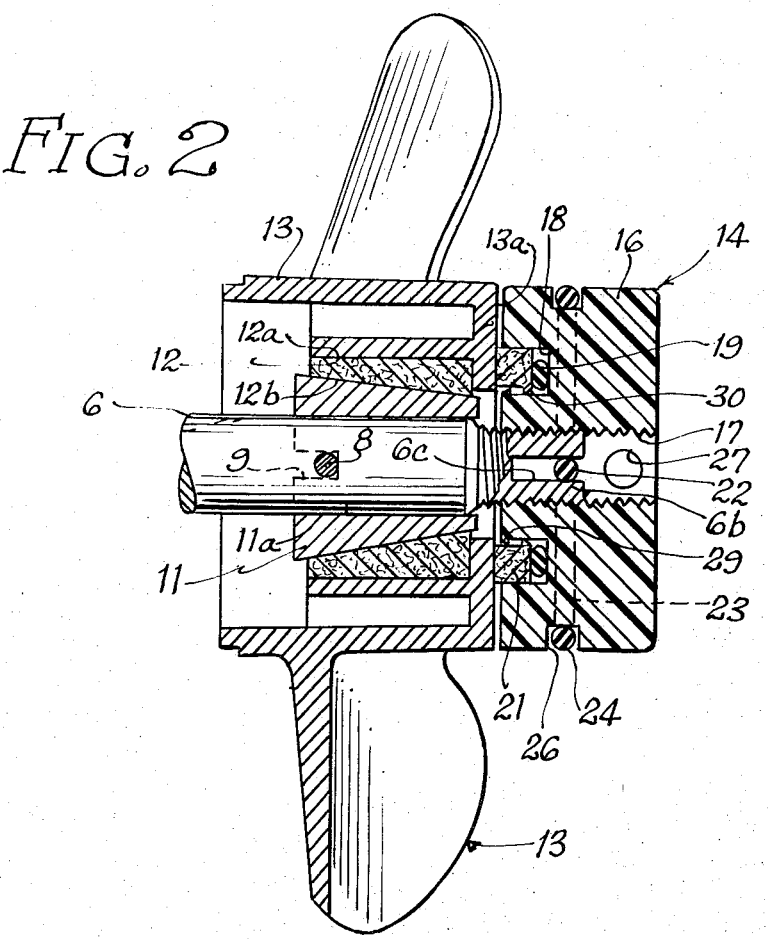
FIG. 2 is a vertical cross-sectional view of the device shown in FIG. 1, in assembled relation.

Referring to the drawings, my invention is shown embodied in the underwater leg 5 of an outboard motor. The gear housing 5a rotatably supports the propeller shaft 6 in a conventional manner, with the shaft protruding rearwardly.

A drive pin 8 is passed through an opening in the propeller shaft 6 and the protruding ends of the pin engage in slots 9 of a drive cone 11, the inside bore 11a of which clears the unthreaded portion of the shaft 6 by a few thousandths of an inch and the outside surface of which is frusto-conical. The drive cone 11 is formed of a suitable metal, such as bronze. A friction element 12, preferably formed of asbestos-based clutch material, has a generally cylindrical outer surface 12a and a frusto-conical inner surface 12b. This element is tightly pressed into the hub of the propeller 13 so as to become an integral part thereof. The conical surface 12b of the friction element 12 engages with the outer surface of the drive cone 11 to provide a torque-transmitting-interface between the propeller shaft 6 and the propeller 13.

A special hub nut assembly 14 comprises a body 16 formed preferably of a polyamide plastic, such as Nylon or an acetal resin such as Decrin. The body is provided with a threaded central hole 17 to engage the threaded portion 6b of the propeller shaft 6, and also with an annular recess 18 in an end face in which is received an elastomeric O-ring 19, typically formed of synthetic rubber or the like, and a pressure ring 21, typically formed of a suitable low friction plastic composition, such as a glass-filled fluorocarbon capable of withstanding substantial compression loadings and occasional heating without distortion or loss of dimensional integrity. The nut assembly 14, the structure and function of which hereinafter will be described in greater detail, is threaded onto the propeller shaft 6 to secure the propeller 13 thereon. A lock pin 22 is inserted through one of a plurality of radial holes 23 provided in the body 16 so as to engage in the slot 6c at the free end of shaft 6. This arrangement locks the nut assembly 14 to the shaft 6 and prevents relative movement between the parts. Finally, to retain the lock pin 22 against loss, an elastomeric O-ring 24 of synthetic rubber or the like, is installed in a circumferential groove 26 in registration with the radial holes 23.

Cooperating interlocking beveled annular flanges 29 and 30 are formed on the body 16 and pressure ring 21 respectively, and afford means for preserving the assembly of the body and pressure ring against inadvertent separation while permitting relative movement between the parts.

The hub nut assembly 14, which constitutes the heart of my invention, is the means which provides the necessary normal force or pre-load to maintain proper clutch engagement for the transmission of a desired level of torque. The O-ring 19 performs the function of a spring. The pressure ring 21 retains the O-ring 19 within the recess 18 and transmits the spring force to the face 13a of the propeller 13. As will be seen in FIG. 1 the pressure ring 21 protrudes beyond the propeller-side of the body 16 under the urging of the O-ring 19, so that when a compressive force is exerted on the pressure ring 21 it will move more deeply into the recess 18 by compressing the O-ring 19. To adjust the clutch preload, then, is simply a matter of tightening the nut assembly 14 on the threaded propeller shaft 6 until a desired compressive force level is attained. This is effected by placing a rod or any suitable tool in the spanner hole 27 provided in the body 16 and with this tool rotating the nut assembly 14 until the body 16 bottoms on the face 13a of the propeller hub. Thereafter, the nut assembly is unthreaded by a prescribed number of lock pin holes 23, and finally secured in an adjusted position by inserting the lock pin 22 and installing the O-ring 24 in the groove 26.

To test the efficiency of my invention a cone clutch was fabricated with the conical surfaces of the components 11 and 12 having an included angle equal to 16° and a coefficient of friction of 0.3 (with steel). The dimensions of the recess 18 in the body 16 were as follows: outside diameter 1 ⅝ in., inside diameter 1 in., and depth 0.315 in. The pressure ring 21 had a thickness of 0.215 in. and diametral dimensions substantially similar to those of the recess 18. The specifications of the O-ring 19 were as follows: inside diameter 1.037 in., width 0.210 in. and Durometer hardness 70 on the Shore A scale. The body 16 had eight equally spaced radial holes 23 and the thread pitch in the central hole 17 was 11 threads per inch. To adjust this clutch for a 7 ½ HP engine, the body 16 was tightened until it "bottomed" on the face 13a of the propeller hub, then was loosened a fraction of a turn equivalent to the angular distance of three radial holes 23 and finally secured in the adjusted position, in the manner previously described. The slip torque corresponding to this adjustment equaled 200 inch lbs. Numerous tests were then conducted to subject the apparatus to severe abuse by operating the motor on a small boat and running repeatedly through shallow water under full throttle conditions thereby, forcing the propeller to impinge upon the bottom. Whenever the propeller shaft torque exceeded the precalibrated slip torque, the clutch slipped and then re-engaged after the boat cleared the shallow regions. Notwithstanding this repeated abuse, the propeller sustained only mild surface wear due to the abrasive influence of the sand and gravel on the bottom. Under similar test conditions with the propeller protected by the standard shear pin, there was considerable damage to the propeller and, in several instances, shear pin breakage. The calibrated slip torque, as measured from time to time with a torque wrench, never varied by more than ± 10 percent. There was no evidence of measurable wear or deterioration of the nut assembly or clutch elements.

This test was then repeated with a 15 HP engine utilizing a clutch and hub assembly having the same dimensional specifications as the unit installed on the 7 ½ HP engine. Only the calibration was different. In this case the body 16 was loosened by an angular distance equal to two radial holes 23 rather by three holes, as in the previous case. The slip torque corresponding to this adjustment equaled 300 inch-lbs. The tests described above were repeated with substantially the same results.

Various changes coming within the scope of my invention will now suggest themselves to those skilled in the art, for example, my invention is compatible with disc clutches, as well as cone clutches. Accordingly, I do not wish to be limited to the specific embodiment described herein, but intend the same to be merely exemplary, the scope of my invention being limited only be the appended claims.

I claim:

1. In combination a driving shaft threaded at one end and having a transverse driving pin, a driven member having a generally cylindrical hub having an end face, a conical rearwardly tapering driving clutch member carried on said shaft and having a transverse slot receiving said driving pin, a friction clutch element having a conical bore and constituting a driven friction clutch member coacting with said driving clutch member, said driven friction clutch member being fixed in said driven member, an adjusting member in threaded engagement with said shaft, said adjusting member having an end face having an annular recess therein which is disposed in confronting relation to the end face of the hub, an elastomeric ring received in said recess, a pressure ring partially received in said annular recess in abutment with said elastomeric ring and in thrust engagement with the end face of the hub of the driven member, said adjusting member being adjustable to effect a desired axial pre-load force to maintain contact between said driving and driven members.

2. The invention as defined in claim 1 including means for locking said adjusting member in a position of adjustment.

3. The invention as defined in claim 1 in which the driving clutch member is formed of metal and the driven clutch member is formed of an asbestos based clutch material.

4. The invention as defined in claim 1 in which the pressure ring is formed of a reinforced fluorocarbon material.

5. The invention as defined in claim 1 in which the driven member is a propeller.

6. The invention as defined in claim 1 in which the adjusting member is formed of a polyamide.

7. The invention as defined in claim 2 in which the locking means includes a plurality of spaced radial holes in said adjusting member and a pin extending through said shaft and certain of said radial holes to hold said adjusting member in a desired position relative to said shaft.

8. The invention as defined in claim 7 including a peripheral groove in said adjusting member in registration with said openings and an elastomeric band in said peripheral groove to retain said pin.

9. The invention as defined in claim 1 in which the adjusting member is formed of an acetal resin plastic material.

* * * * *